(12) United States Patent
Gera

(10) Patent No.: US 11,990,984 B2
(45) Date of Patent: May 21, 2024

(54) COMMUNICATION SYSTEM WITH INCREASED THROUGHPUT

(71) Applicant: Airbus Defence and Space GmbH, Taufkirchen (DE)

(72) Inventor: Damini Gera, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 120 days.

(21) Appl. No.: 17/534,790

(22) Filed: Nov. 24, 2021

(65) Prior Publication Data

US 2022/0173803 A1     Jun. 2, 2022

(30) Foreign Application Priority Data

Dec. 2, 2020 (DE) ..................... 10 2020 131 988.6

(51) Int. Cl.
*H04B 7/26* (2006.01)
*H04B 1/707* (2011.01)

(52) U.S. Cl.
CPC ........... *H04B 7/2628* (2013.01); *H04B 1/707* (2013.01)

(58) Field of Classification Search
CPC ... H04B 7/2628; H04B 1/707; H04J 13/0022; H04J 13/0044; H04J 13/0077
See application file for complete search history.

(56) References Cited

U.S. PATENT DOCUMENTS

| 37,802 | A | 3/1863 | Baird | |
|---|---|---|---|---|
| 5,210,770 | A | 5/1993 | Rice | |
| 6,236,672 | B1 * | 5/2001 | Hiramatsu | H04L 1/0002 370/335 |
| 7,228,113 | B1 * | 6/2007 | Tang | H04B 7/0845 455/67.11 |
| 10,797,732 | B1 * | 10/2020 | Shattil | H04B 1/0003 |
| 2006/0045193 | A1 * | 3/2006 | Stolpman | H04L 25/0226 375/260 |
| 2007/0025464 | A1 * | 2/2007 | Perlman | H04L 1/0057 375/267 |

(Continued)

FOREIGN PATENT DOCUMENTS

| EP | 0 809 373 A2 | 11/1997 |
|---|---|---|
| EP | 1 191 712 A2 | 3/2002 |

OTHER PUBLICATIONS

European Search Report for Application No. 21210166 dated Apr. 8, 2022.

(Continued)

*Primary Examiner* — Tejis Daya
(74) *Attorney, Agent, or Firm* — KDW Firm PLLC

(57) ABSTRACT

A communication system with increased throughput for providing communication between transceivers via a wireless communication channel through multiple, N, single input, single output, SISO, links provided for a corresponding number, N, of data sequences, wherein each transceiver includes a transmitter having spreading units each configured to spread in an operation mode of the communication system a data sequence with an associated predefined unique spreading code sequence to generate a spread data sequence multiplexed to an antenna unit of the respective transceiver configured to transmit the spread data sequences via the wireless communication channel to antenna units of other transceivers of the communication system.

12 Claims, 6 Drawing Sheets

(56) References Cited

U.S. PATENT DOCUMENTS

| | | | |
|---|---|---|---|
| 2007/0147439 A1 | 6/2007 | Rhee et al. | |
| 2008/0095122 A1* | 4/2008 | Khandekar | H04B 7/2637 370/335 |
| 2008/0205552 A1* | 8/2008 | Sartori | H04L 25/03866 375/267 |
| 2017/0078028 A1* | 3/2017 | Zhang | H04B 10/0795 |
| 2019/0334642 A1* | 10/2019 | Pandey | H04L 7/0066 |

OTHER PUBLICATIONS

Chih-Lin et al., "IS-95 Enhancements for Multimedia Services," AT&T Technical Journal, American Telephone and Telegraph Co. New York, US, vol. 1, No. 2, Sep. 21, 1996, pp. 61-62.

Chih-Lin et al., "Multi-Code CDMA Wireless Personal Communications Networks", Communications—Gateway to Globalization, Proceedings of the International Conference on Communications, Seattle, Jun. 18-25, 1995, New York, IEEE, US, vol. 2, pp. 1060-1064.

Lee, Jun Hwan et al., "Pre-Rake System Applied with Frequency Domain Equalization in Multi-Code TDD-CMA," Personal, Indoor and Mobile Radio Communications, 2005. PIMRC 2005, IEEE 16th International Symposium on Berlin, Germany, Sep. 11-14, 2005, Piscataway, NJ, USA, IEEE, vol. 1, pp. 447-451.

German Search Report for Application No. 102020131988 dated Jul. 30, 2021.

* cited by examiner

COMMUNICATION SYSTEM WITH INCREASED THROUGHPUT

CROSS-REFERENCE TO RELATED APPLICATION

This application claims priority to German Patent Application No. DE 10 2020 131 988.6 filed Dec. 2, 2020, the entire disclosure of which is incorporated by reference herein.

TECHNICAL FIELD

The disclosure herein relates to a communication system for providing communication between transceivers via a wireless communication channel with an increased data throughput, and in particular to a communication system used in context with aviation.

BACKGROUND

In aviation, there are a plurality of communication systems which require communication between different entities, in particular aircrafts, satellites and/or base stations. A communication system forms an integral part of an aircraft, in particular airplanes or helicopters or other flying objects such as flying taxis. These communication systems can perform a wide range of different functions. One application of these communication systems is data communication to transport voice data, image data or any other kind of data exchanged between different entities of the communication system. For example, a communication system integrated in an aircraft can provide communication with another aircraft, with a satellite system and/or with a cellular base station like a tower, gate or airport terminal. These systems can support backhaul connections for control and command functions, inside-cabin communication and/or in-flight passenger connectivity. Communication systems can also be used for position estimation or localization of an aircraft. Other possible applications of a communication system used in aviation comprise of weather radars or other air safety systems.

Because of the limited frequency spectrum and the limitation concerning spatial multiplexing for aeronautical use, there is a need to enhance the data throughput of the employed communication system. A data throughput can be defined by the number of bits transmitted via the communication channel per second.

SUMMARY

Accordingly, it is an object of the disclosure herein to provide a method and system increasing the data throughput of data communicated between transceivers of the system.

This object is achieved according to a first aspect of the disclosure herein by a communication system disclosed herein.

The disclosure herein provides according to a first aspect a communication system for providing communication between transceivers via a wireless communication channel through multiple, N, single input, single output, SISO, links provided for a corresponding number, N, of data sequences, wherein each transceiver comprises a transmitter having a plurality of spreading units each adapted or configured to spread in an operation mode of the communication system a data sequence with an associated predefined unique spreading code sequence to generate a spread data sequence multiplexed to an antenna unit of the respective transceiver adapted to transmit the spread data sequences via the wireless communication channel to antenna units of other transceivers of the communication system.

In a possible embodiment of the communication system according to the first aspect of the disclosure herein, the data sequences are received by the transmitter of the transceiver in parallel data streams.

In a further possible alternative embodiment of the communication system according to the first aspect of the disclosure herein, the data sequences are received by the transmitter of the transceiver in a serial data stream.

In a further possible embodiment of the communication system according to the first aspect of the disclosure herein, each transceiver comprises a receiver having a plurality of despreading units each adapted to despread the spread data sequences received via the wireless communication channel by the antenna unit of the respective transceiver with the associated predefined spreading codes to recover the corresponding original data sequences.

In a further possible embodiment of the communication system according to the first aspect of the disclosure herein, the transmitter of a transceiver comprises a plurality, N, of encoding units adapted to encode data sequences received in parallel data streams to provide encoded data sequences and a corresponding number of modulation units adapted to modulate the encoded data sequences to provide modulated encoded data sequences supplied to the spreading units of the transmitter of the respective transceiver.

In a further possible embodiment of the communication system according to the first aspect of the disclosure herein, the transmitter of a transceiver comprises:
 an encoding unit adapted to encode data sequences received in a single data stream to provide encoded data sequences;
 a modulation unit adapted to modulate the encoded data sequences to provide modulated encoded data sequences; and
 a serial-to-parallel conversion unit adapted to convert the modulated encoded data sequences into parallel data sequences supplied to the spreading units of the transmitter of the respective transceiver.

In a further possible embodiment of the communication system according to the first aspect of the disclosure herein, the receiver of the transceiver comprises:
 a plurality, N, of demodulation units adapted to demodulate the despread data sequences output by the despreading units of the receiver to provide demodulated data sequences; and
 a corresponding number, N, of decoding units adapted to decode the demodulated data sequences to provide decoded demodulated data sequences output by the receiver of the transceiver in parallel data streams.

In a further possible embodiment of the communication system according to the first aspect of the disclosure herein, the receiver of the transceiver comprises:
 a parallel-to-serial conversion unit adapted to convert the despread data sequences output by the despreading units of the receiver into a single serial data sequence;
 a demodulation unit adapted to demodulate the serial data sequence to provide a demodulated data sequence; and
 a decoding unit adapted to decode the demodulated data sequence to provide a decoded demodulated data sequence output by the receiver of the transceiver in a single data stream.

In a further possible embodiment of the communication system according to the first aspect of the disclosure herein, the communication system comprises a synchronous communication system using orthogonal spreading code sequences or others.

In a further possible embodiment of the communication system according to the first aspect of the disclosure herein, the communication system comprises an asynchronous communication system using pseudorandom spreading code sequences or others.

In a still further possible embodiment of the communication system according to the first aspect of the disclosure herein, each encoding unit of the transmitter of a transceiver is adapted to perform a Forward Error Correction, Convolutional Coding, Turbo Coding, Polar Coding and/or other coding techniques of data sequences to provide encoded data sequences.

In a further possible embodiment of the communication system according to the first aspect of the disclosure herein, each modulation unit of the transmitter of a transceiver is adapted to perform Binary Phase Shift Keying, Quadrature Phase Shift Keying, M-Quadrature Amplitude Modulation and/or other modulation techniques to modulate the encoded data sequences.

In a further possible embodiment of the communication system according to the first aspect of the disclosure herein, the throughput of the communication system is given by:

$$T = N \cdot B \ (1 + SNR),$$

wherein
B is the bandwidth of the communication channel,
SNR is the signal-to-noise ratio and
N is the number of parallel SISO links.

In a further possible embodiment of the communication system according to the first aspect of the disclosure herein, the transceivers of the communication system are integrated in aircrafts, satellites and/or base stations and/or in entities of automotive systems or industrial systems.

In a further possible embodiment of the communication system according to the first aspect of the disclosure herein, the transceivers of the communication system are adapted to transmit and receive data sequences simultaneously by Time Division Duplexing, Frequency Division Duplexing or other duplexing techniques.

The disclosure herein further provides according to a further aspect a method for increasing a throughput of a communication system disclosed herein.

The disclosure herein provides according to this aspect a method for increasing a throughput of a communication system using multiple, N, single input, single output, SISO, links for a corresponding number, N, of data sequences, wherein each data sequence is spread with an associated predefined spreading code sequence to generate a spread data sequence transmitted via a common wireless communication channel of the communication system.

BRIEF DESCRIPTION OF THE DRAWINGS

In the following, possible embodiments of the different aspects of the disclosure herein are described in more detail with reference to the enclosed figures.

DETAILED DESCRIPTION

Figure 1:
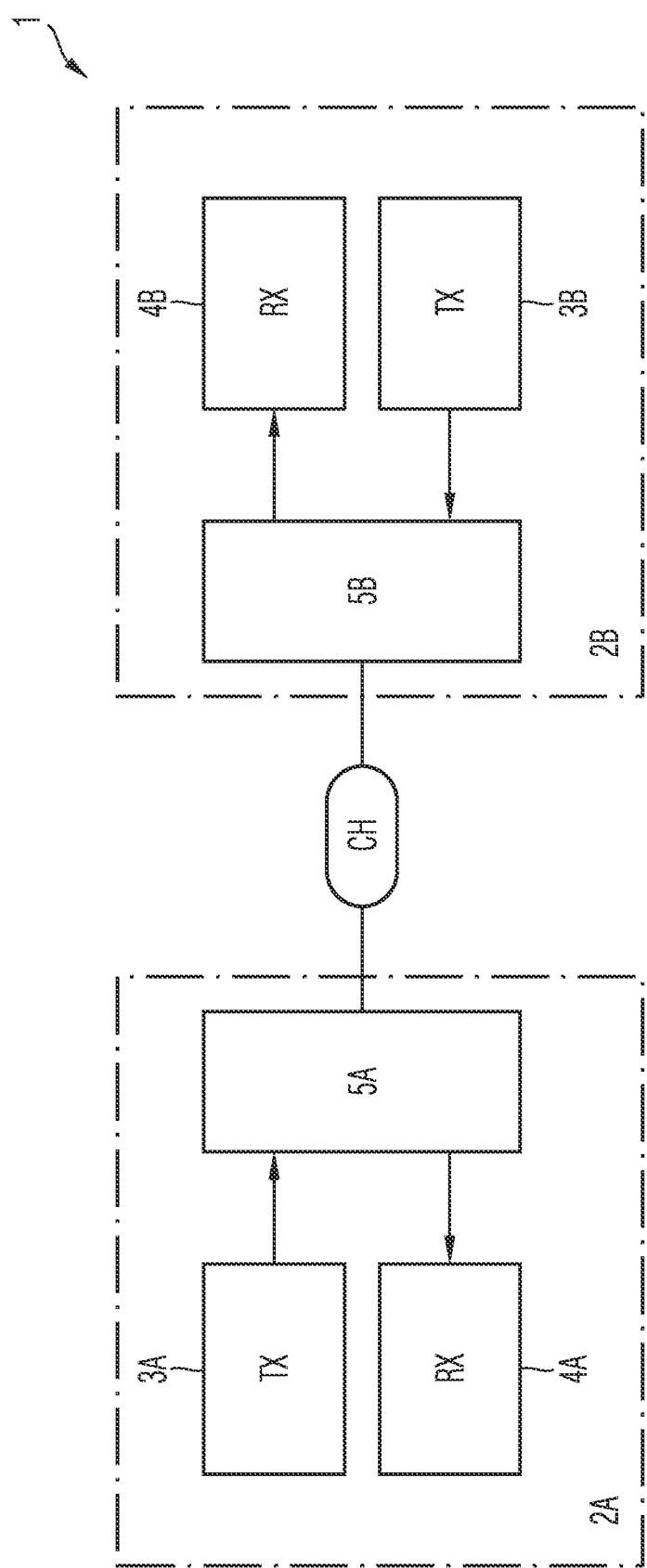
FIG. 1 shows a block diagram of a possible example embodiment of a communication system according to the first aspect of the disclosure herein.

As can be seen in the schematic block diagram of FIG. 1, the communication system 1 according to the first aspect of the disclosure herein comprises transceivers 2 communicating with each other via a common wireless communication channel CH. In the illustrated example, a first transceiver 2A communicates with a second transceiver 2B via the wireless communication channel CH. The communication between the different transceivers 2 of the communication system 1 can be performed bidirectional. Each transceiver 2 of the communication system 1 comprises a transmitter 3, a receiver 4 and an antenna unit 5 as also illustrated in FIG. 1. As can be seen in FIG. 1, the transceiver 2A comprises a transmitter 3A, a receiver 4A and an antenna unit 5A. Further, the transceiver 2B comprises a transmitter unit 3B, a receiver unit 4B and an antenna unit 5B. The transceivers 2A, 2B are adapted to transmit and receive data sequences simultaneously by implementing duplexing techniques. To transmit and receive data simultaneously in both forward and reverse directions, duplexing techniques such as Time Division Duplexing (TDD), Frequency Division Duplexing (FDD) or others can be implemented. The transceivers 2A, 2B illustrated in the block diagram of FIG. 1 can be integrated in different entities of an aviation system such as aircrafts, satellites or base stations. The aircrafts can comprise for example airplanes or helicopters. The communication system 1 can be provided for exchange of different kinds of data, in particular control data, voice data or image data. For example, a transceiver 2A integrated in a first aircraft may communicate with a transceiver 2B integrated in another aircraft. Further, the transceiver 2A integrated in an aircraft can communicate with another transceiver 2B which is integrated in a base station such as a tower terminal, a gate terminal or an airport terminal. The amount and type of data transmitted in uplink (UL) and downlink (DL) directions can vary both in type and data volume. Discontinuous transmission performed in Time Division Duplexing TDD over unique uplink UL and downlink DL time slots can be separated by a guard period. The uplink and downlink channel can be reciprocal but synchronization between the transceivers 2A, 2B is required. With Frequency Division Duplexing FDD, continuous transmission can be realized over uplink and downlink paired frequency spectrum separated by a guard band. The wireless communication channel CH is non-reciprocal and timing synchronization is not as critical. The uplink to downlink capacity ratio can be modified dynamically in Time Division Duplexing TDD only and not in Frequency Division Duplexing FDD. Based on system requirements and the characteristics of the wireless communication channel 3CH, a suitable Time Division Duplexing TDD or Frequency Division Duplexing FDD technique can be implemented in the communication system 1 according to the disclosure herein.

The communication system 1 as illustrated in FIG. 1 provides communication between transceivers 2 via the wireless communication channel CH via multiple, N, single input, single output, SISO, links provided for a corresponding number, N, of data sequences or data channels.

A single input, single output, SISO, system is a communication system in which one antenna is used at the transmitter and one antenna is used at the receiver. For a given bandwidth B and signal-to-noise SNR ratio, an upper limit of the data throughput T is given for a conventional SISO communication system by T=B·(1+SNR). In the communication system 1 according to the disclosure herein as illustrated in the embodiments of FIGS. 1 through 5, the throughput T of the communication system 1 is increased significantly and is given by:

T=N·B (1+SNR) wherein B is the bandwidth of the communication channel CH, SNR is the signal-to-noise ratio and N is the number of parallel SISO links. In the communication system 1 according to the disclosure herein, each transceiver 2 comprises a transmitter 3 having a plurality of spreading units SPR which are adapted to spread in an operation mode of the communication system 1, a data sequence with an associated predefined unique spreading code sequence SPRC to generate a spread data sequence multiplexed to an antenna unit 5 of the respective transceiver 2 adapted to transmit the spread data sequences via the wireless communication channel 3 to antenna units 5 of other transceivers of the communication system 1. The communication system 1 according to the disclosure herein has multiple SISO links functioning in parallel. In a first mode of operation, these SISO links can use a multiple access technique such as Time Division Multiple Access (TDMA), a Frequency Division Multiple Access (FDMA), a Space Division Multiple Access (SDMA), etc. to share available resources. This implies that either time slots or frequency spectrum or space domain is shared by the multiple SISO links of the communication system 1 in the first mode of operation. The Time Division Multiple Access (TDMA) channel access scheme is based on Time Division Multiplexing (TDM). TDMA provides different time slots to different transmitters in a cyclically repetitive frame structure. In contrast, Frequency Division Multiple Access (FDMA) is a channel access method used in multiple access protocols. FDMA allows to send data through a single communication channel by dividing the bandwidth of the communication channel into separate non-overlapping frequency subchannels. Further, Space Division Multiple Access (SDMA) is a channel access method based on creating parallel spatial pipes (focused signal beams). In the second mode of operation of the communication system 1, the SISO links can also function at the same time, in the same frequency spectrum and in the same space domain. This can result in interference and data packet collisions between the parallel SISO links. This is, however, mitigated in the communication system 1 according to the disclosure herein by the design of an integrated Code Division Multiple Access (CDMA) system with parallel SISO links. Multiple SISO links can function simultaneously and asynchronously by spreading the modulated data streams with preassigned respective unique spreading code sequences.

Figure 2:
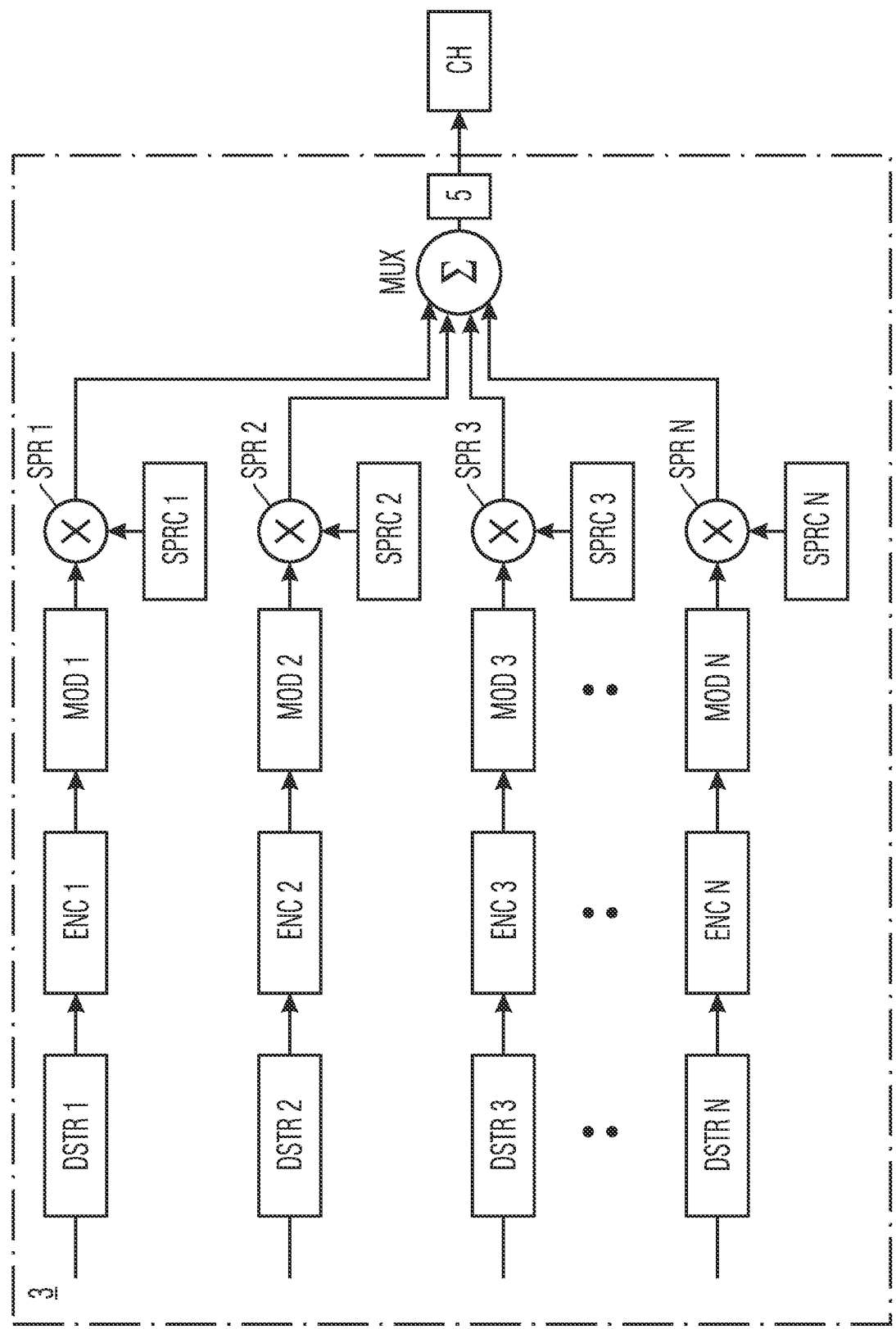
FIG. 2 shows a block diagram of a possible example embodiment of a transmitter within a transceiver of a communication system according to the disclosure herein.
Figure 4:
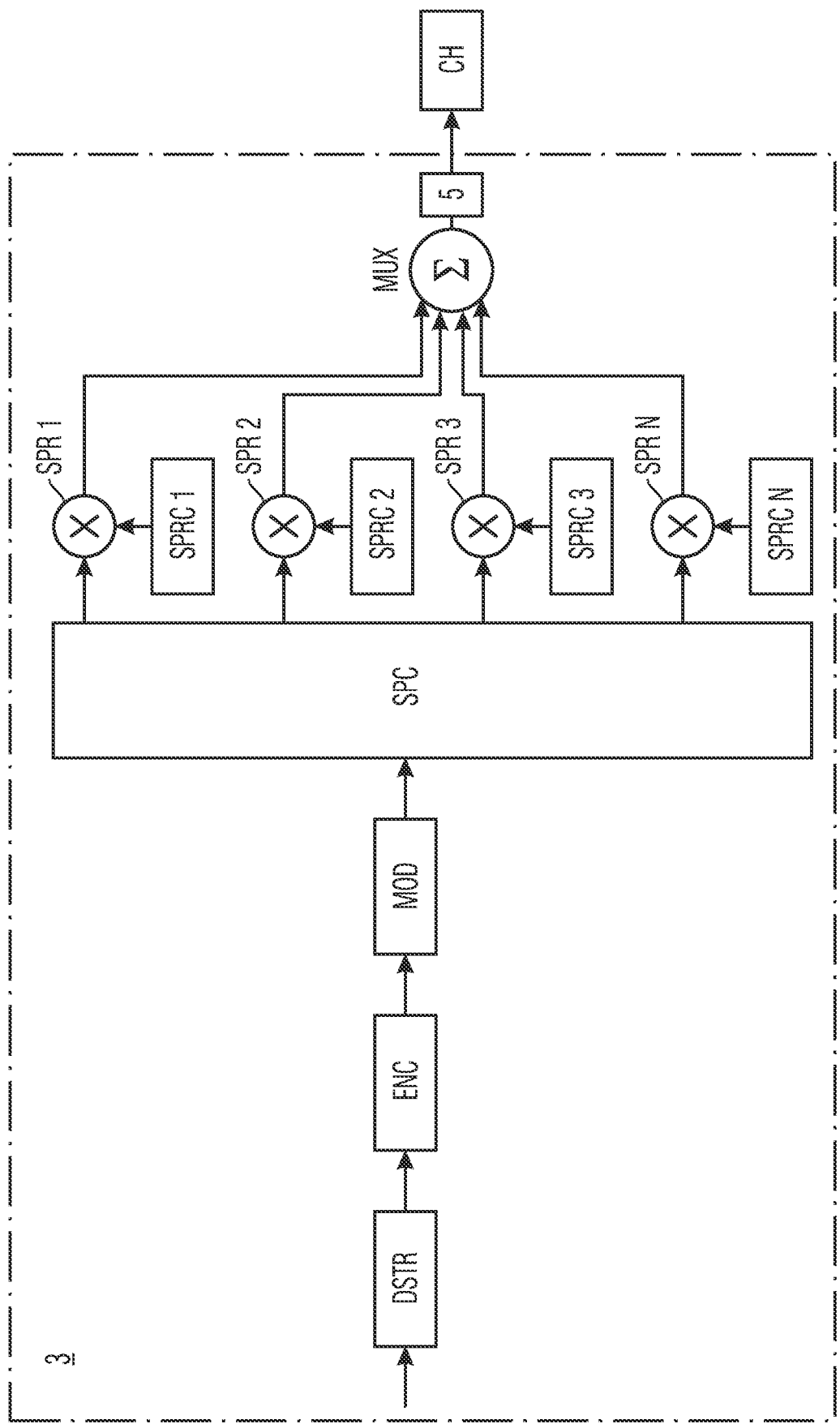
FIG. 4 shows a block diagram of a possible further example embodiment of a transmitter within a transceiver of a communication system according to the first aspect of the disclosure herein.

The transmitter 3 of the transceiver 2 can receive the data sequences either in parallel data streams as illustrated in FIG. 2 or in a single serial data stream as illustrated in the block diagram of FIG. 4.

Figure 3:
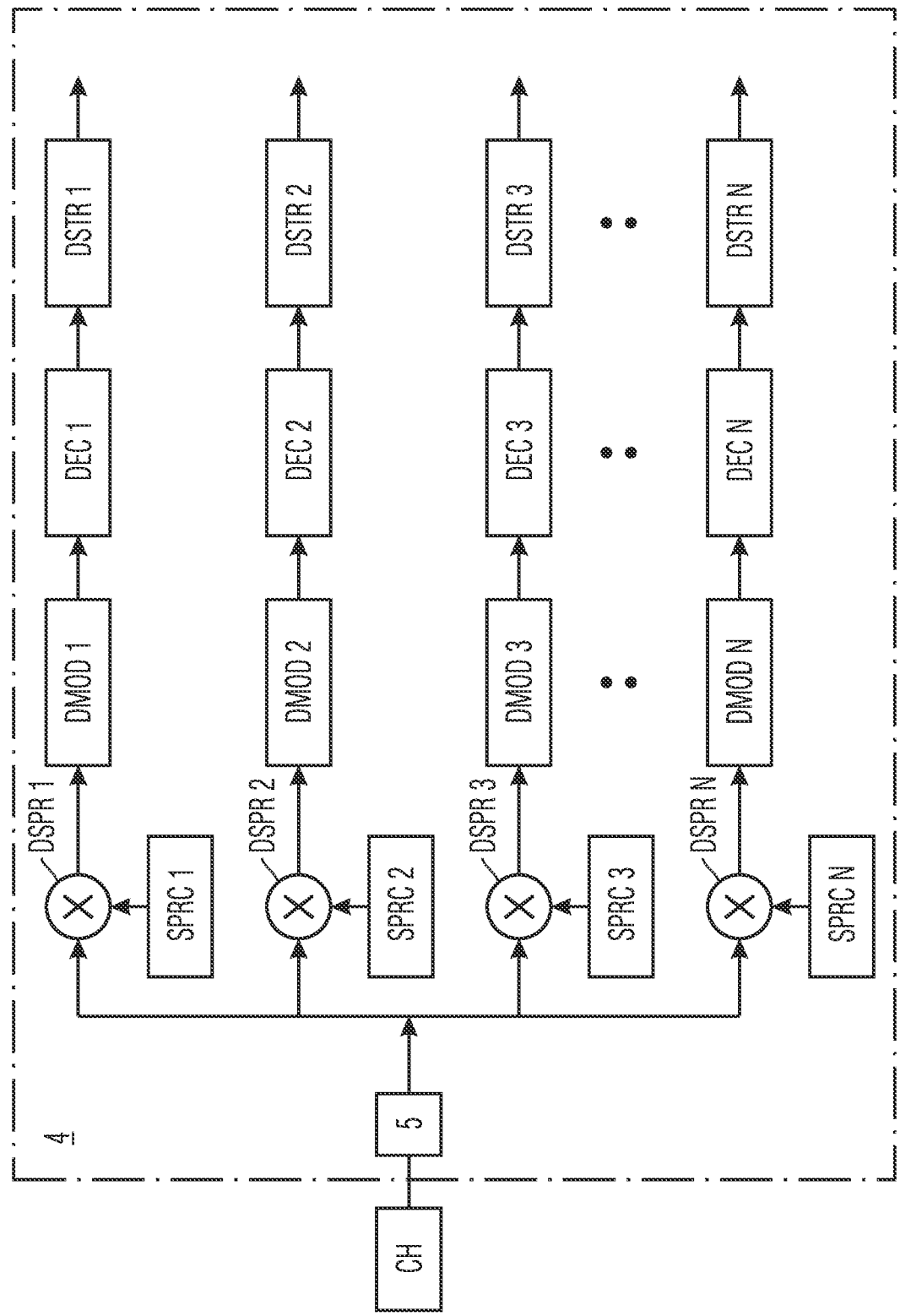
FIG. 3 shows a block diagram of a possible example embodiment of a receiver within a transceiver of a communication system according to the disclosure herein.

FIGS. 2 and 3 illustrate a first variant A of a transceiver 2 of the communication system 1 according to the disclosure herein. In this variant, the transceiver 2 gets data sequences in IN parallel data streams DSTR from different data sources or a common data source. In contrast, in the variant II of the transceiver 2 as illustrated in the block diagrams of FIGS. 4 and 5, the transceiver 2 gets data sequences in a single data stream DSTR-IN and outputs a single data stream DSTR-OUT.

In the first variant I of the transceiver 2, the transmitter 3 is configured as illustrated in FIG. 2 and the receiver 4 is configured as illustrated in FIG. 3. The transmitter 3 as shown in FIG. 2 comprises a plurality, N, of encoding units ENC-1 to ENC-N adapted to encode data sequences received in parallel data streams to provide encoded data sequences. The transmitter 3 further comprises a corresponding number, N, of modulation units MOD-1 to MOD-N adapted to modulate the encoded data sequences to provide modulated encoded data sequences supplied to the spreading units SPR-1 to SPR-N adapted to spread the data sequences with associated predefined unique spreading code sequences to generate spread data sequences multiplexed (MUX) to the antenna unit 5 of the respective transceiver 2. The spread data sequences output by the spreading units SPR-1 to SPR-N are multiplexed or superimposed for transmission by the antenna unit 5 of the respective transceiver 2. Accordingly, FIG. 2 illustrates an integrated single user CDMA transmitter 3 with multiple SISO links.

FIG. 3 shows a corresponding receiver 4 adapted to generate N parallel data streams DSTR. The receiver 4 comprises a plurality of despreading units DSPR-1 to DSPR-N each adapted to despread the spread data sequences received via the wireless communication channel CH by the antenna unit 5 of the respective transceiver 2 with the associated predefined spreading codes to recover the corresponding original data sequences. As can be seen in the embodiment of FIG. 3, the receiver 4 further comprises a plurality, N, of demodulation units DMOD-1 to DMOD-N adapted to demodulate the despread data sequences output by the despreading units DSPR-1 to DSPR-N of the receiver 4 to provide demodulated data sequences. The receiver 4 further comprises a corresponding number, N, of decoding units DEC-1 to DEC-N adapted to decode the demodulated data sequences to provide decoded demodulated data sequences output by the receiver 4 of the transceiver 2 in N parallel data streams as illustrated in FIG. 3. Accordingly, FIG. 3 illustrates an integrated single user CDMA receiver 4 with multiple SISO links.

Figure 5:
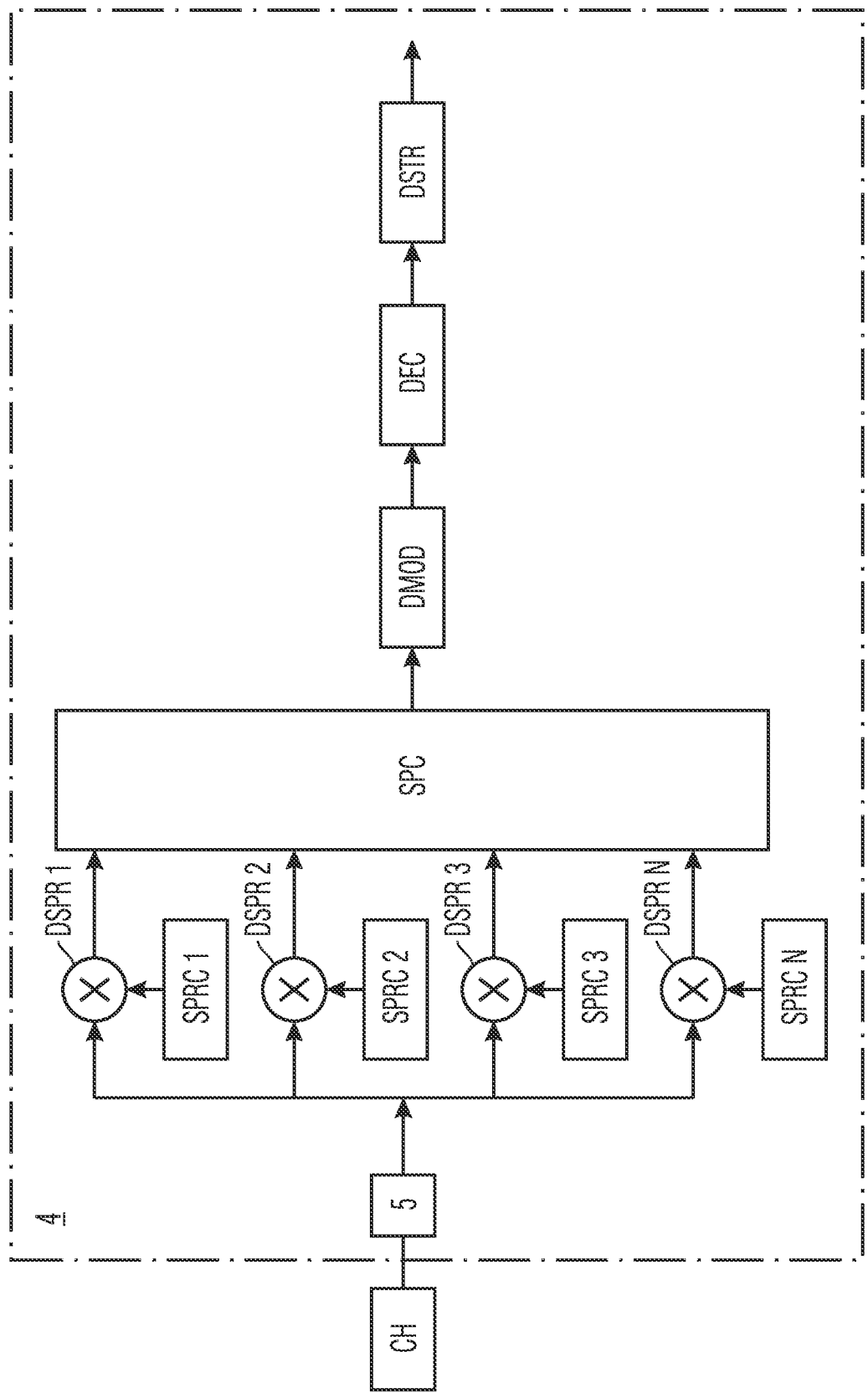
FIG. 5 shows a block diagram of a further possible example embodiment of a receiver within a transceiver of a communication system according to the disclosure herein.

FIGS. 4 and 5 illustrate a second variant II of a transceiver 2 which can be used in a communication system 1 according to the disclosure herein. In the illustrated second variant II as shown in FIGS. 4 and 5, the transmitter 3 receives data sequences in a single serial data stream. Further, the receiver 4 as shown in FIG. 5 outputs a single data stream. As can be seen in FIG. 4, the single data stream is supplied to a single encoding unit ENC adapted to encode data sequences received in the single data stream to provide encoded data sequences. Further, the transmitter 3 comprises a modulation unit MOD adapted to modulate the encoded data sequences to provide modulated encoded data sequences supplied to a serial-to-parallel conversion unit SPC adapted to convert the modulated encoded data sequences into parallel data sequences supplied to the spreading units SPR-1 to SPR-N of the transmitter 3 of the respective transceiver 2. The spreading units are adapted to spread the data sequences with associated predefined unique spreading code sequences to generate spread data sequences multiplexed to the antenna unit 5 of the respective transceiver 2.

FIG. 5 illustrates the corresponding receiver 4 having a parallel-to-serial conversion unit PSC adapted to convert the despread data sequences output by the despreading units of the receiver 4 into a single serial data sequence. The receiver 4 as shown in FIG. 5 further comprises a demodulation unit DMOD adapted to demodulate the serial data sequence output by the parallel to serial conversion unit PSC to provide a demodulated data sequence supplied to a decoding unit DEC. The decoding unit is adapted to decode the demodulated data sequence to provide a decoded demodulated data sequence output by the receiver 4 of the transceiver 2 in a single data stream as shown in FIG. 5.

The integrated CDMA transceiver system employed by the communication system 1 according to the disclosure herein can enhance the data throughput of the system by nearly N times with N being the number of parallel SISO links. The communication system 1 according to the disclosure herein is more resistant to interference, jamming and multipath propagation effects, in comparison to TDMA, FDMA and SDMA techniques. For an asynchronous communication system 1, a pseudorandom code or a gold code can be used as spread data sequences. A gold code is a set of random sequences, often called pseudo noise sequences that are statistically uncorrelated. For a synchronous system, orthogonal codes such as Hadamard codes or Orthogonal Variable Spreading Factor Codes can be employed by the communication system 1 according to the disclosure herein.

Each encoding unit of the transmitter 3 of the transceiver 2 can be adapted to perform a coding technique including Forward Error Correction FEC, Convolutional Coding, Turbo Coding and/or Polar Coding, etc. Further, techniques like interleaving and data redundancy (encoding) can be used at the transmitter side and for recovery at the receiver side (decoding) so that data loss can be minimized. Each modulation unit of the transmitter 3 of a transceiver 2 can be used to apply modulation techniques ranging from Binary Phase Shift Keying BPSK and Quadrature Phase Shift Keying QPSK to M-Quadrature Amplitude Modulation M-QAM and others.

In the communication system 1 according to the disclosure herein, each data stream or data sequence is processed with a respective orthogonal code sequence and can then be transmitted after multiplexing. At the receiver side, individual data streams are recovered after processing with respective code sequences which are already known to the receiver 4. Different variations of the communication system 1 can be employed for an increased throughput.

After multiplexing of the coded data streams, the information can either be transmitted using single carrier or over multiple carriers (Orthogonal Frequency Division Multiple or OFDM). The multi-carrier techniques can comprise multi-carrier CDMA (MC-CDMA), multi-carrier direct sequence CDMA and multi-tone CDMA (MT-CDMA).

In a possible embodiment, the transmitter 3 of the transceiver 2 can perform power control to ensure that the resources are shared equally among all SISO links and that the system capacity can be maximized. The relative path loss and shadowing effects can be modeled in a possible implementation using log normal distribution and the relative power levels can then be estimated.

At the transceivers 2 of the communication system 1, the data processing can be performed in a possible implementation with a single processor. As an alternative, the processing can also be done through different independent processors and then, the data can be multiplexed (by physical layer processing) or can be routed (by network layer processing) to deliver it to the correct destination address.

The antenna units 5 can comprise in a possible implementation of a single antenna elements (like a monopole or dipole). In an alternative implementation, the transceiver antenna unit 5 can consist of a plurality of antenna elements (like an antenna array). The antenna units 5 can also be used for controlling the transmitting power and can comprise modulating and demodulating circuits at the transmitter and receiver ends, respectively.

The communication system 1 according to the disclosure herein as illustrated in FIG. 1 can be used in a preferred embodiment for an aviation system where the transceivers 2 are integrated in aircrafts, base stations or satellites. The term aircraft, here, refers to a manned aircraft such as an airplane, a helicopter or flying taxis, but also to an unmanned aircraft such as a drone. The communication system 1 according to the disclosure herein can also be used in space communications, in automotive systems, in trains and/or in cellular applications for electronic devices. These systems can be suitable for civil or military communications.

The communication system 1 and the transceivers can be used as stand-alone or in combination with already existing cellular systems (2G, 3G, 4G, 5G or others) or any other kind of communication systems (such as, Bluetooth, WiFi, WiMax, LDACS, etc.). The communication system 1 can be used to provide communication between different entities such as aircrafts or base stations. The system 1 can support backhaul connections for control and command functions, inside-cabin communications and/or in-flight passenger connectivity. Further, the communication system 1 can be used for position estimation or localization. For example, a Global Positioning System GPS to calculate the absolute height above sea level or a Radar Altimeter (RALT) to estimate the height above ground level can use the communication system 1 according to the disclosure herein. Other examples of possible applications include Instrument Landing System ILS and Traffic Collision and Avoidance System TCAS. Further possible applications include weather radars (WXR) or other systems. The Remotely Piloted Aircraft Systems (RPAS) and Beyond Visual Line of Sight (BVLoS) systems can use the communication system 1 according to the disclosure herein to provide increased data throughput. Further examples include Unmanned Aerial Systems UAS and flying passenger vehicles for remote controlling or even autonomous flying operations.

Figure 6:
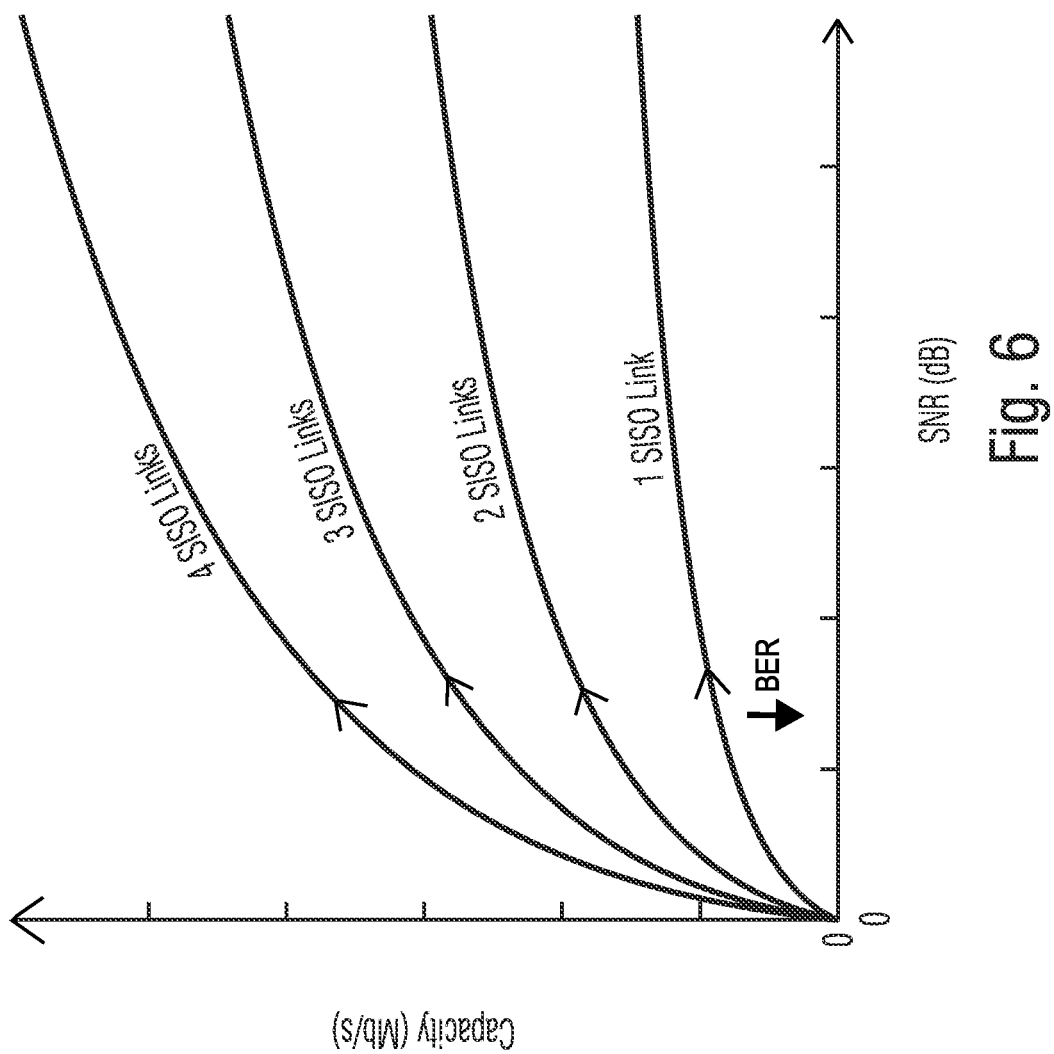
FIG. 6 shows a diagram for illustrating the data throughput and a bit error rate with a single versus multiple CDMA-based SISO link communication system to illustrate the benefit of the communication system according to the disclosure herein.

The end-to-end Quality of Service QoS is paramount to design a reliable, safe and efficient communication system for these different kinds of applications. The most relevant QoS metrics of the communication system 1 according to the disclosure herein are end-to-end latency, packet loss, jitter, out-of-order delivery and the data throughput. By combining a Code Division Multiple Access CDMA technique with a SISO communication system, the data throughput T can be significantly enhanced as also illustrated in the schematic diagram of FIG. 6. FIG. 6 illustrates a throughput and bit error rates BER that results for a communication system 1 with single versus multiple CDMA-based SISO links. As can be seen from FIG. 6, with every new parallel SISO link being added, the throughput T of the communication system 1 increases significantly.

The subject matter disclosed herein can be implemented in or with software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 communication system
2 transceiver
3 transmitter
4 receiver
5 antenna unit
CH channel
SPR spreading unit
DSPR dispreading unit
SPRC spreading code
MOD modulation unit
DMOD demodulation unit
ENC encoding unit
DEC decoding unit
DSTR data stream
MUX multiplexer

The invention claimed is:

1. A communication system for providing communication between transceivers via a wireless communication channel through multiple, N, single input, single output, SISO, links provided for a corresponding number, N, of data sequences,
    wherein each transceiver is configured to receive the data sequences in a single data stream,
    wherein each transceiver comprises a transmitter comprising:
        an encoding unit configured to encode data sequences received in the single data stream to provide encoded data sequences;
        a modulation unit configured to modulate the encoded data sequences to provide modulated encoded data sequences; and
        a serial-to-parallel conversion unit (SPC) configured to convert the modulated encoded data sequences into parallel data sequences; and
        a plurality of spreading units each configured to spread in an operation mode of the communication system a data sequence of the parallel data sequences with an associated predefined unique spreading code sequence to generate a spread data sequence multiplexed to an antenna unit of a respective transceiver configured to transmit the spread data sequences via the wireless communication channel to antenna units of other transceivers of the communication system.

2. The communication system according to claim 1, wherein communication system is configured for the data sequences to be received by the transmitter of the transceiver in parallel data streams or in a serial data stream.

3. The communication system according to claim 1, wherein each transceiver comprises a receiver having a plurality of despreading units each configured to despread the spread data sequences received via the wireless communication channel by the antenna unit of the respective transceiver with the associated predefined spreading codes to recover the corresponding data sequences.

4. The communication system according to claim 3, wherein the receiver of the transceiver comprises:
    a plurality, N, of demodulation units configured to demodulate the despread data sequences output by the despreading units of the receiver to provide demodulated data sequences; and
    a corresponding number, N, of decoding units configured to decode the demodulated data sequences to provide decoded demodulated data sequences output by the receiver of the transceiver in parallel data streams.

5. The communication system according to claim 3 wherein the receiver of the transceiver comprises:
    a parallel-to-serial conversion unit (PSC) configured to convert the despread data sequences output by the despreading units of the receiver into a single serial data sequence;
    a demodulation unit configured to demodulate the serial data sequence to provide a demodulated data sequence; and
    a decoding unit configured to decode the demodulated data sequence to provide a decoded demodulated data sequence output by the receiver of the transceiver in a single data stream.

6. The communication system according to claim 1, wherein the communication system comprises a synchronous communication system using orthogonal spreading code sequences or others.

7. The communication system according to claim 1, wherein the communication system comprises an asynchronous communication system using pseudorandom spreading code sequences or others.

8. The communication system according to claim 1, wherein each encoding unit of the transmitter of a transceiver is configured to perform a Forward Error Correction, Convolutional Coding, Turbo Coding, Polar Coding or other coding techniques of data sequences to provide encoded data sequences.

9. The communication system according to claim 8, wherein each modulation unit of the transmitter of the transceiver is configured to perform:
   Binary Phase Shift Keying (BPSK);
   Quadrature Phase Shift Keying (QPSK);
   M-Quadrature Amplitude Modulation (M-QAM) or other modulation techniques of the encoded data sequences.

10. A communication system for providing communication between transceivers via a wireless communication channel through multiple, N, single input, single output, SISO, links provided for a corresponding number, N, of data sequences,
   wherein each transceiver comprises a transmitter having a plurality of spreading units each configured to spread in an operation mode of the communication system a data sequence with an associated predefined unique spreading code sequence to generate a spread data sequence multiplexed to an antenna unit of a respective transceiver configured to transmit the spread data sequences via the wireless communication channel to antenna units of other transceivers of the communication system, and
   wherein a throughput, T, of the communication system is given by:

$$T = N \cdot B \, (1 + SNR),$$

wherein
B is a bandwidth of the communication channel,
SNR is a signal-to-noise ratio, and
N is a number of parallel SISO links.

11. The communication system according to claim 1, wherein the transceivers of the communication system are integrated in aircrafts, satellites and or base stations and or in entities of automotive systems or industrial systems.

12. The communication system according to claim 1, wherein the transceivers of the communication system are configured to transmit and receive data sequences simultaneously by Time Division Duplexing (TDD), Frequency Division Duplexing (FDD) or others.

* * * * *